Oct. 9, 1951   H. R. ALLEN ET AL   2,570,419
MULTIPLE CLAMP

Filed Nov. 13, 1947   2 Sheets-Sheet 1

INVENTORS
HAROLD R. ALLEN AND
BY GEORGE C. BARBER

Edwin Coates
ATTORNEY

Oct. 9, 1951     H. R. ALLEN ET AL     2,570,419
MULTIPLE CLAMP

Filed Nov. 13, 1947     2 Sheets-Sheet 2

INVENTORS
HAROLD R. ALLEN AND
BY GEORGE C. BARBER
Edwin Coates
ATTORNEY

Patented Oct. 9, 1951

2,570,419

UNITED STATES PATENT OFFICE 2,570,419

MULTIPLE CLAMP

Harold R. Allen, Venice, and George C. Barber, Los Angeles, Calif., assignors to Douglas Aircraft Company, Inc., Santa Monica, Calif.

Application November 13, 1947, Serial No. 785,656

10 Claims. (Cl. 248—68)

This invention relates to supports of the clamp type and particularly to supports for clampingly holding such members as the ejector stacks of aircraft engine exhaust systems immobile and in pre-determined spaced relationship to each other, so as to retain the adjacent stacks in a compact bundle and prevent such vibration thereof as would damage the stacks, the engine, the engine mount and the accessories in the engine nacelle.

Although the invention is especially well adapted for the mentioned use, it is by no means limited in the scope of its utility to such employment or such environment. For, as will become apparent hereinafter, the invention may be employed to support and clamp any type of elongate vibratory objects immovably in a cluster and maintain them therein in a predetermined spaced relationship to each other, so as to support these objects while preventing oscillation, translation, or other movements thereof.

In modern aircraft engine exhaust systems, the ejector stacks are led rearwardly from the cylinder heads and come into parallel adjacency in groups of two or more, emerging from the engine nacelle in this number or in larger numbers. At or before their exit from the nacelle, the groups must be supported and immobilized, for the reasons that not only are the ordinary or sub-resonant vibrations of these stacks sufficient to eventually cause displacement and distortion thereof, but since the vibrations transmitted to the stacks by the engine are cumulative, they gradually build up to their resonant frequency. These resonant vibrations react upon the engine stack-connections and augment engine vibrations, rupture the connections or displace or distort the stacks.

Stack supports hitherto proposed not only fail to suppress the ordinary or sub-resonant vibrations of the stacks, but invariably permit these vibrations to reach a resonant frequency. Moreover, such stack-end supports become stretched or otherwise distorted by the vibrations, allowing the hot stacks to displace into harmful contact with wiring and piping in the engine nacelle. Prior stack supports incorporating rigid inner clamp-jaw members also eventually cause the outer jaw or strap to crush the stacks against the rigid inner jaw when the stacks and inner jaw expand under thermal influences.

The present invention provides engine exhaust ejector stack positioning and immobilizing means which gather the stacks into a compact, rigid, massive, columnar cluster and supports the individual stacks therein in a predetermined spatial relationship while reducing the vibrations of the individual stacks and of the cluster as a whole substantially to the minimum. Thereby not only are sub-resonant vibrations and their distorting and displacing effects eliminated, but also the more serious resonant vibrations are prevented. The supports cannot stretch or otherwise distort under any but the most exceptional conditions and the support is incapable of crushing the ejector-stacks.

To achieve these and other ends, the construction embodying the invention essentially comprises stress exerting annular means peripherally engaging said cluster clampingly, these means applying their stresses to the stacks in such manner as to form or urge them into a compact bundle in which the stacks are spatially separated and rendered vibrationless. The annular means may, in one embodiment, consist of a more or less annular tension strap circumscribing the cluster and stressed to draw the stacks together into a bundle; while in another form of the invention, these means comprise a pair of concentric annular clamp-jaws disposed to respectively engage the outer periphery of the cluster in tension and to engage the inner periphery thereof in compression and flexure, and to thereby position the stacks spacedly in a bundle and to hold them vibrationless.

In either form, these annular means include portions re-entrant between adjacent stacks. Resilient spacers are arranged in these re-entrant portions, on opposite faces of adjacent portions of the annular means, and extend transversely of the stacks. Securing means are securingly passed through the resilient members and the annular means to clamp said jaws against the interposed stacks and to position said resilient members in the aforedescribed attitudes so as to enable them to resiliently resist movement of the stacks towards each other and automatically return the stacks to their original positions subsequent to said movement.

In any embodiment of the invention, the annular stress-exerting means and the resilient spacers are of such a nature and are so constructed and arranged as to, in effect, unify the stacks or form them into a short column of relatively large diameter and considerable mass.

In order to exemplify these and other inventive concepts, several constructional versions of the invention are illustrated in the accompanying drawings and described hereinafter in conjunction therewith. It is to be understood, however, that the invention is limited in the structural forms which it may take, only by the scope of the annexed claims.

Figure 1:
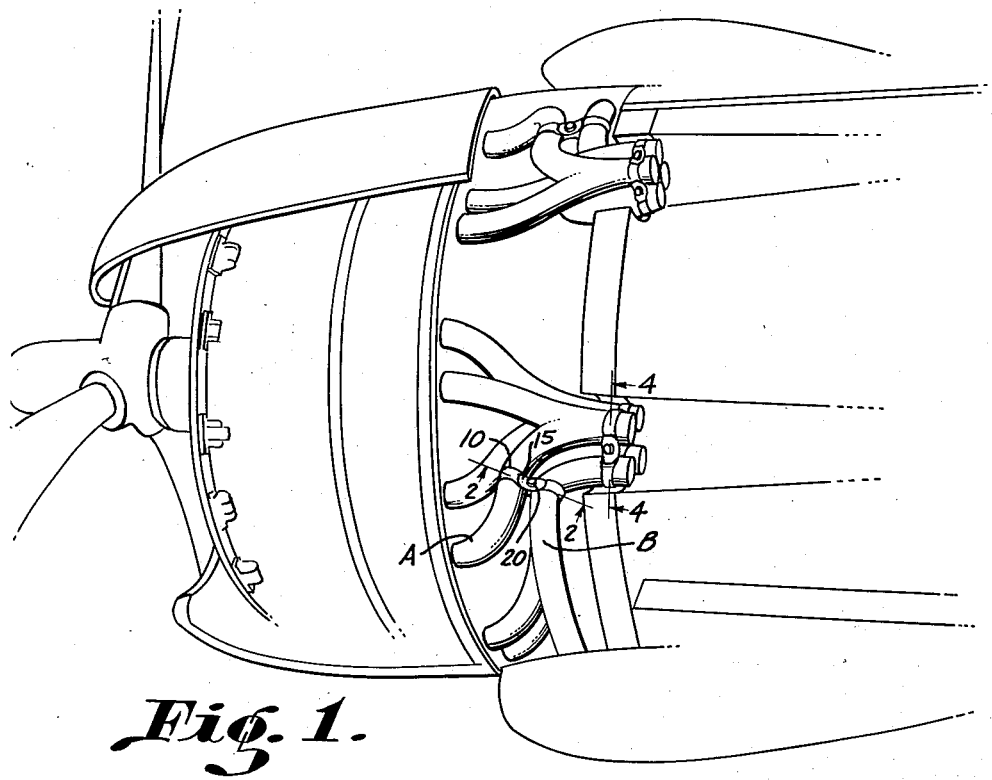
Figure 1 is a side view of one side of an aircraft engine and its exhaust system, sighting forwardly.
Figure 2:
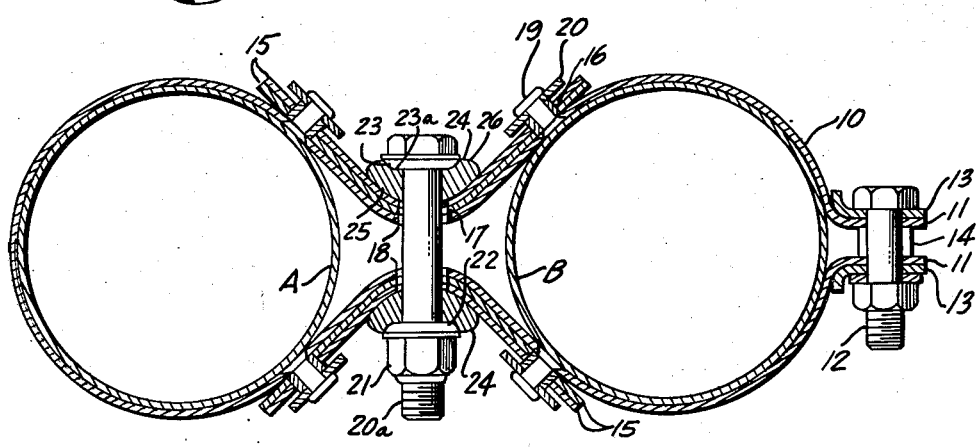
Figure 2 is a vertical section on line 2—2 of Figure 1, sighting in the direction of the arrows and illustrating the construction of the so-called "single-jaw clamp" form of the support.
Figure 3:
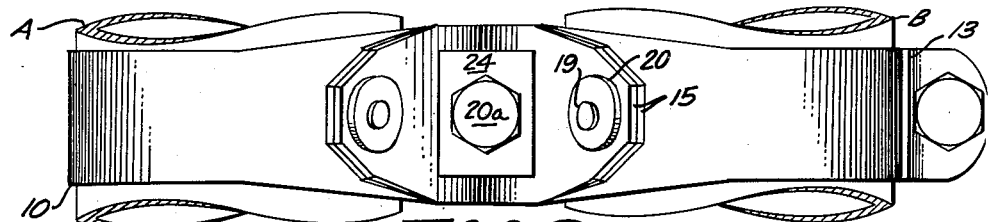
Figure 3 is an enlarged detailed plan view of this form of the support.

Referring first to the form of the invention detailed in Figures 2 and 3, the construction includes an open-ended strap 10 circumscribing two adjacent stacks, A and B, the opposite sides of the strap being re-entrant between the adjacent stacks. The opposite ends 11 of the strap take the form of apertured ears and the bolt 12 of a bolt and nut unit is passed through the apertures. The nut of this unit may be set up to draw the strap tightly about the pair of stacks. Preferably, a wear plate 13 is provided under the bolt head and another one is mounted under the nut. A bolt spacer 14 may be mounted adjacent the bolt head to limit the tension applicable to the strap.

A pair of incurved, or saddle shaped, leaf springs 15, each having an off-round aperture 16 at each end and a smaller off-round aperture 17 in its central portion, is arranged on each of the opposite outer faces of the strap. The central portions of the springs are disposed congruent with the constricted portions of the strap, in the space between the stacks, while the opposite ends thereof extend transversely of the stacks. Each of the inbent portions of the strap 10 is provided, medially thereof, with a slot 18 extending longitudinally of the strap and lying in substantial registry with each of the adjacent apertures 17. Mounted on the strap substantially at the points of tangency of the constricted portions thereof with the stacks are detents or anchor-members 19. In one embodiment, these detents may take the form of sleeved flat-headed rivets supporting washers 20 under their heads. The apertures 16 surround the detents 19 and permit longitudinal movement of the leaf springs, while also allowing slight rotational movement thereof.

A bolt 20a is passed through the openings 17 and 18 on the one side of the device and extends therefrom normal to the line joining the centers of the stacks and through the similar openings 17 and 18 on the opposite side of the device. The protruding portion of the bolt is provided with a nut 21, the inner face of which bears a partially spherical protuberance 22. Adjacent the inner face of the head of the bolt is a washer 23 the inner face of which is shaped as a partially spherical protuberance 23a. Between the protuberance 23a on the washer 23 and the adjacent face of the leaf-spring unit is disposed an elongate saddle washer 24 having a semi-cylindrical surface 25 adapted to fit in the trough of the incurved leaf spring and including a concave upper surface 26 adapted to fit the surface 23a.

Between the bolt nut and the adjacent face of the leaf spring is disposed a saddle washer 24 identical with the one previously described and acting in a similar manner. Consequently, the bolt may trunnion about these spherical surfaces at each end thereof when stresses are applied thereto. Thereby the bolt is subjected to tension only, eccentric loading or flexure thereof, when the bolt nut is tightened or when the springs, strap, or stacks move relatively to the bolt, being transformed into tension.

The washers 24 also distribute the bolt head loading over a relatively large area of the strap, thereby obviating localized distortion of the same and, if desired, enabling the application of inwardly directed tension to the strap in the portions thereof lying between the stacks.

When the strap is tensioned around the stacks by means of the bolt 12, the leaf springs resiliently oppose the inward movement of the stacks induced by the strap tension, yet yield and permit a certain degree of inward movement thereof under exceptional shock loads on the stacks. The thus flexed springs then react and urge the stacks outwardly into their original positions. Thus, the stacks are subjected to balanced stresses and are maintained substantially constantly in their predetermined spatial relationships, at the same time being restrained against individual vibration.

Contrasted to the action of a single piece flat spring interposed between the stacks, the leaves in each of the present spring units undergo their maximum stresses at the four points lying on the inner and outer faces of the ends thereof and thus require considerably more force to bend them than is likely to be applied thereto by vibratory or thermal influences. They thus retain their resiliency and maintain the stacks in their desired positions under all but the aforementioned shock loads, when they yield and react as described.

Because of the springs, it is unnecessary to bring the re-entrant portions of the strap into contact with each other, as in prior such supports. Consequently, "pinching" of deeply re-entrant portions of the strap against the stacks is eliminated. Elongation of the annular strap incident to the straightening out of such deeply re-entrant strap portions is also minimized, so that the strap does not loosen around the stacks and eventually leave them free or not well supported and positioned.

The leaf springs, being capable of slight rotational and transverse movements relatively to the stacks, accommodate themselves to stack movements, and thus maintain their effective positions and perform their resilient spacing returning and positioning functions regardless of shock displacements of the stacks.

The strap itself is composed of an annealed steel and hence is not likely to be stretched beyond its elastic limit and become permanently loosened around the stacks, by either mechanical or thermal forces applied thereto. It, therefore, constantly urges the stacks toward a common center and against the leaf springs, so as to maintain the stacks spaced in a balancedly stressed condition.

The stacks are thus resiliently but positively held substantially immobile in a substantial vibrationless condition, but without any liability of their being crushed as in some prior supports.

The thus clustered stacks, whether both extend rearwardly from the engine in floating condition or one as a cantilever with the other suspended from it, are in effect unified by the device into the form of a substantially rigid, short column of relatively large diameter, the rigidity of which column minimizes the vibrations of the cluster. The mass effect of this column is sufficient to prevent same from vibrating to its resonant frequency and the mutual interaction of the interconnected stacks effects rapid damping of what little vibration may still tend to occur in the individual stacks under unusual conditions.

Figure 4:
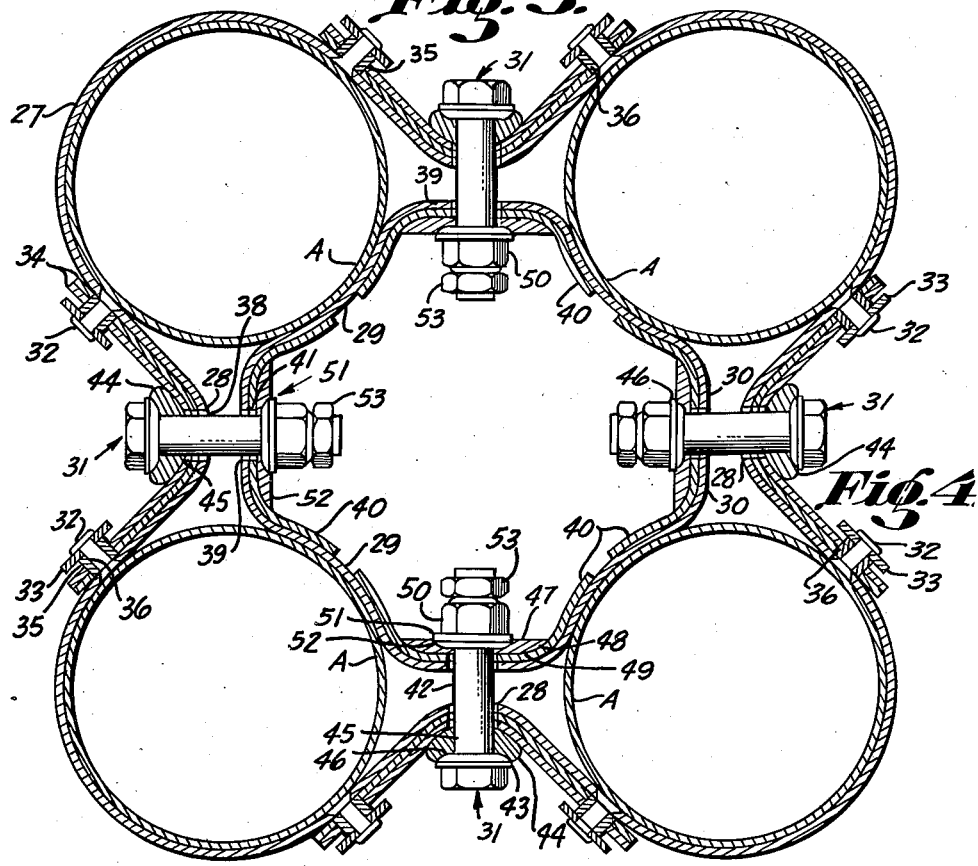
Figure 4 is a vertical section on line 4—4 of Figure 3, showing the construction of the so-called "double-jaw clamp" form of the support.
Figure 5:
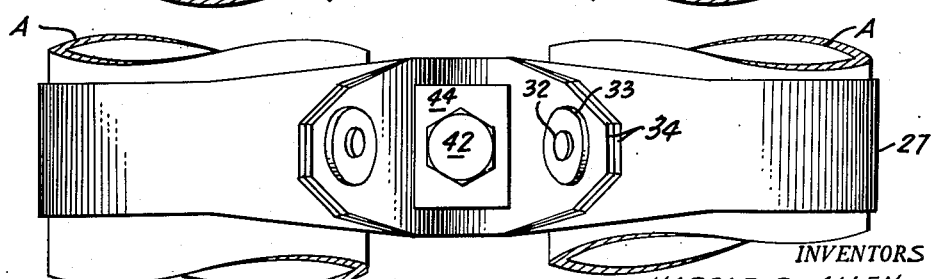
Figure 5 is an enlarged detailed plan view of the latter form of the support.

In the embodiment detailed in Figures 4 and 5, the clamping and supporting device comprises a closed or continuous strap member 27 circumscribing four stacks A, forming them into an exit cluster for the exhaust system of the larger engines. The strap is composed of a resilient, hardened steel, incurved or inwardly re-entrant between adjacent stacks at four diametrically opposite locations 28. Its dimensions are such, where it is to contact the stacks, that it can be loosely slid over the stack ends and around the cluster. Disposed in the hollow center of the cluster and extending transversely thereof is a support member 29, consisting of a resilient, continuous metallic band of hardened steel, formed into an octagon with alternate sides 30 extending outwardly between adjacent stacks.

The strap 27 is adapted to be drawn tightly around the outer peripheries of the stacks by forces applied at the four diametrically opposite points of inflection 28 by means of securing units 31 uniting the strap to the support 29. The tensioning and uniting means thereby urge the inner peripheries of the stacks against the alternate outer faces of the centrally disposed support member 29, the two members 27 and 29 therefore in effect constituting the two jaws of a clamp. Since the two upper stacks shown in the cluster usually extend rearwardly as cantilever beams, the members 27 and 29 constitute not only a clamp but function as a support for in effect suspending the two lower stacks from the two upper stacks.

As in the preceding embodiment, headed detents 32 are attached to the strap at suitable points on the upper ends of the strap troughs that lie between the stacks. A washer 33 is preferably provided under the head of each detent. A pair of incurved, or concave, elongate leaf springs 34 are arranged between adjacent stacks on each of the outer faces of the strap and extends transversely of the adjacent stacks. Each end of each leaf spring is provided with an off-round aperture 35 and a rivet spacer 36 is preferably disposed in these apertures and around each detent 32. The central portion of each leaf spring contains an off-round aperture 37 and the central region of each indented portion of the strap 27 lying between the adjacent stacks is provided with a longitudinally extending slot 38.

The central portion of each of the sides of the octagonal support 29 which lie between the adjacent stacks is longitudinally slotted as at 39 and a single, concave leaf spring 40 is disposed in face-wise contact with the inner face of the support, fitting into the indentations in the support between adjacent stacks. The central portion of each of the leaf springs 40 is provided with an off-round aperture 41 registering with the slot 39.

The aforementioned securing units include a bolt 42 provided between each two of the adjacent stacks and passes through the aforedescribed openings in the outer springs and strap and through the openings in the support and inner springs. Adjacent the inner face of the head of the bolt is a washer 43, the inner face of which constitutes a partially spherical protuberance 43a. Interposed between the washer 43 and the trough of the sub-adjacent leaf spring is an elongate saddle washer 44. The washer is provided with a semi-cylindrical inner face 45 adapted to seat in the trough of the outer leaf springs and a concavity 46 in its outer face adapted to seat the protuberance 43a on the washer 43. Mounted on the inner face of each spring 40, is a washer 47 having its inner face contacting the adjacent face of the spring 40 and a central concavity 48 in its opposite face 49.

Mounted on the bolt inwardly of the washer 47 is a stop nut 50. Interposed between the outer face of this nut and the concavity 48 in the washer 47 is a smaller washer 51 having a spherical outer face 52. The stop nut 50 is preferably locked in place by means of a lock nut 53.

When the bolts 42 are set up, the strap 27 draws the stacks circumferentially together against the outer and inner springs 34 and 40 and radially against alternate sides of the octagonal support 29. The outer and inner springs 34 and 40, and the included portions 30 of the support resiliently oppose the circumferential movements of the stacks, and the sides of the support 29 that contact the stacks, as well as the adjacent ends of the inner springs 40, resiliently oppose the radial movement of the stacks. There is thus established a balance of forces which immobilizes the stacks against vibration and at the same time maintains them spaced circumferentially and radially in their desired spatial relationships.

As in the preceding embodiment, eccentric loading of either end of the bolts 42 is avoided by the aforedescribed trunnion construction at each end of the bolt. This construction, because of the self-adjusting and centering tendency of the spherical contacting surfaces, enables the bolt to automatically align itself normal to the line joining the stack centers, so that the bolt assumes this position under all stresses applied thereto. The bolts are therefore subjected only to tension and never to flexures or other stresses.

Contrary to previous practice, it is unnecessary to bring the re-entrant portions of the clamp jaws into contact, because of the efficient action of the leaf springs in maintaining the stacks resiliently spaced in their proper positions. Consequently, there is no danger either of "pinching" the annular members or of loosening same. The device nonetheless maintains the individual stacks properly spaced and substantially vibrationless.

The clamp device of the present invention unifies the stacks into a short, relatively thick column, the rigidity and mass of which are such that vibration of the cluster is minimized, never reaching a frequency or amplitude approaching the resonant frequency. Accordingly, no reaction sufficient to loosen or rupture the attachments or stacks to the cylinder heads can be set up, nor is it possible for sympathetic vibrations resulting from resonance to be applied to the engine, engine mount, or accessories. In the cluster, the individual stack vibrations are minimized and the stacks are normally maintained in their predetermined spatial relationships. If they are displaced by unusual shocks, the resilient spacers automatically return them to their original positions.

Although the strap-member and the support-member tend to expand diametrally under thermal effects, each is composed of the same hardened steel so that the inner, or support, member expands radially outwardly sufficiently to urge the stacks against the also expanded outer member, or strap. Since both members are resilient, they yield slightly under stack reactions sufficiently to prevent crushing of the stacks. The hardened steel outer, or strap, member has an elastic limit sufficiently high to prevent it from being permanently stretched and loosened by mechanical forces and the composition thereof is such as to resist heat-corrosion. The support is relatively readily installed, since the strap can be loosely slid onto the outer sides of the stack ends in an untensioned condition, the central support member and leaf springs including sufficient clearance from the inner sides of the stack with the bolts untensioned to enable easy seating of the stacks on the inner support member, whereupon the stacks may be quickly unified into a rigid unit by a few turns on each of the nuts 50.

We claim:

1. A support for an exhaust ejector stack cluster, comprising: annular means peripherally engaging said cluster, said annular means including portions entering the space between adjacent stacks; leaf springs arranged in said entrant portions transversely between adjacent stacks on opposite faces of said annular means; and securing means passing through said leaf springs and said annular means and lying transversely between adjacent stacks and drawing said entrant portions together transversely of said stacks and anchoring said leaf springs in place so as to enable the same to resiliently resist said drawing movement and independent movement of the stacks toward each other and automatically return the same to their original positions subsequent to said movement; whereby to maintain the stacks in a substantially non-vibratory condition and in a predetermined mutually spaced relationship in the form of a short, relatively thick column of such rigidity and mass as to be unable to vibrate at resonant frequency.

2. An engine exhaust ejector stack support, comprising: a tension strap circumscribing said stacks and stressed to maintain the same together in a bundle; an outwardly concave leaf spring unit arranged in facewise contact with each of the outer opposite sides of said strap between adjacent stacks and extending transversely thereof; a bolt and nut unit having the bolt passing rectangularly through the concavity of said spring units and through the adjacent portions of said strap; a washer having a partially spherical inner face seated on the inner face of the bolt head; a similar spherical surface on the inner face of said nut; and a saddle washer operatively interposed between each of said spherical surfaces and the adjacent concave leaf spring; whereby to trunnion said bolt on said leaf springs so as to relieve the bolt of all operational stresses but tension.

3. An engine exhaust ejector stack support, comprising: a tension strap circumscribing said stacks and stressed to draw same together so as to form the same into a bundle, each side of said strap including a longitudinally extending slot; a leaf spring unit arranged in facewise contact with each of the outer opposite sides of said strap between adjacent stacks and extending transversely thereof, each leaf having a centrally disposed aperture; a bolt and nut unit having the shank smaller diametrally than said apertures and passing through the latter and said slots and clampingly bearing at each end against the adjacent leaf spring; detent means projecting outwardly from said strap near the ends of said leaf springs; and surfaces in the end portions of each of said leaves defining therein an aperture surrounding the adjacent detent; whereby to enable longitudinal and rotational movement of said leaf spring while maintaining the leaves in a position to resiliently resist movements of the stacks towards each other.

4. An engine exhaust ejector stack cluster support, comprising: an annular resilient support member disposed centrally of said cluster and facewise contacting inwardly lying portions of the peripheries of said stacks; a tension strap disposed concentrically with said member and circumscribing the outer peripheries of said stacks; resilient members arranged on the outer side of said strap and on the inner side of said support member between adjacent stacks and extending transversely thereof; and securing means lying transversely between adjacent stacks and passed securingly through said resilient members and tensionable to apply circumferentially and radially directed stack clamping forces to said stacks and to maintain said resilient members in the aforedescribed positions and enable them to resiliently resist circumferential and radial movements of said stacks while maintaining the same in a predetermined spaced relationship.

5. An engine exhaust ejector stack cluster support, comprising: a resilient polygonal support member disposed centrally of said cluster and having alternate sides outwardly extending into the space between adjacent stacks; a tension strap disposed concentrically with said support member and circumscribing the exterior peripheries of said stacks and including portions inwardly extending into the space between said adjacent stacks; leaf springs arranged in said entrant portions on the outer side of said strap and on the inner side of said support member and extending transversely of adjacent stacks; and securing means lying transversely between adjacent stacks and passed securingly through said resilient members, said strap and said support and tensionable to apply circumferentially and radially directed stack clamping and bundling forces to said stacks, and to maintain said resilient members in the aforedescribed positions and enable them to resiliently resist circumferential and radial movements of said stacks so as to maintain said stacks in a predetermined spaced relationship.

6. An engine exhaust ejector stack cluster support, comprising: a resilient octagonal support member disposed centrally of said cluster and having alternate sides extending outwardly into the space between adjacent stacks; a tension strap circumscribing the exterior peripheries of said stacks concentrically with said support member and including portions extending inwardly into the space between said adjacent stacks; leaf springs arranged in said entrant portions on the outer side of said strap and on the inner side of said support member and extending transversely of said stack; a bolt and nut unit having the bolt passed through said resilient members, said strap and said support; and means trunnioning the bolt head and said nut on the adjacent leaf springs; whereby to enable said bolt unit to maintain said spring units in the aforedescribed attitudes while thereby subjecting said unit to tension only.

7. An engine exhaust stack cluster support, comprising: a pair of concentric inner and outer annular clamp jaws disposed to respectively engage the inner and outer peripheries of said cluster and position the stacks in a bundle, each jaw including portions entering the space between adjacent stacks; outwardly concave resilient members arranged in said entrant portions and extending transversely of said stacks on the outer side of the outer jaw and on the opposite inner side of the inner jaw; a bolt and nut unit lying between the adjacent stacks and having the bolt passing through said resilient members, said strap and said support; a washer having a partially spherical inner face seated on the inner face of the bolt head; a similar surface on the inner face of said nut; and a saddle washer operatively interposed between each of said protuberances and the adjacent concavity of the adjacent resilient member; whereby to trunnion said bolts on said resilient members so as to relieve the bolts of all operational stresses but tension.

8. An engine exhaust stack cluster support, comprising: a pair of concentric, inner and outer annular clamp jaws disposed to respectively engage the inner and outer peripheries of said cluster and position the stacks in a bundle, each jaw including portions entering the space between adjacent stacks; elongate resilient members, each having a centrally disposed off-round aperture, arranged in said entrant portions and extending transversely of said stacks on the outer side of the outer jaw and on the inner side of the inner jaw; securing means passing securingly through said off-round apertures in said resilient members, said strap and said support; detent means projecting outwardly from said strap near the ends of each of said resilient members; and surfaces on the end portions of each of said resilient members defining in each of said end portions an off-round aperture surrounding the adjacent detent; whereby to enable longitudinal and rotational movements of said resilient members while maintaining said members in a position to resiliently resist movements of the stacks towards each other.

9. A support for an exhaust ejector stack cluster, comprising: annular means for peripherally engaging the stacks in said cluster, said means including a plurality of entrant portions adapted to enter the space between adjacent stacks; leaf spring units arranged in said entrant portions to lie transversely between adjacent stacks on the relatively outer faces of opposed cooperating ones of said entrant portions; and elongate fastening means passing through said spring units and through said opposed entrant portions and lying transversely between adjacent stack engaging portions and clampingly bearing near each end against the adjacent spring unit.

10. A support for an exhaust ejector stack cluster, comprising: annular means for peripherally engaging the stacks in said cluster, said means including a plurality of entrant portions adapted to enter the space between adjacent stacks; leaf spring units arranged in said entrant portions to lie transversely between adjacent stacks on the relatively outer faces of opposed cooperating ones of said entrant portions; bolt and nut means having the bolt portion passing rectangularly through said spring units and said opposed entrant portions; and means trunnioning the bolt head portion and the nut portion on the adjacent spring units; whereby to enable said bolt and nut means to maintain clamping pressure against said spring units while subjecting said bolt portion to tension only.

HAROLD R. ALLEN.
GEORGE C. BARBER.

REFERENCES CITED

The following references are of record in the file of this patent:

UNITED STATES PATENTS

| Number | Name | Date |
| --- | --- | --- |
| 508,822 | Evory | Nov. 14, 1893 |
| 1,363,520 | La Porte | Dec. 28, 1920 |
| 1,608,184 | Rumble | Nov. 23, 1926 |
| 1,649,355 | Lindsey et al. | Nov. 15, 1927 |
| 2,297,146 | Guirl | Sept. 29, 1942 |

FOREIGN PATENTS

| Number | Country | Date |
| --- | --- | --- |
| 399,285 | Great Britain | Oct. 5, 1933 |
| 415,390 | Great Britain | Aug. 21, 1934 |